United States Patent
Claux et al.

(10) Patent No.: US 9,235,803 B2
(45) Date of Patent: Jan. 12, 2016

(54) LINKING WEB EXTENSION AND CONTENT CONTEXTUALLY

(71) Applicant: Microsoft Corporation, Redmond, WA (US)

(72) Inventors: David Claux, Redmond, WA (US); Keyur Patel, Seattle, WA (US); Rolando Jimenez Salgado, Sammamish, WA (US); Warren Byrne, Esparto, CA (US); Jose Calzada Gomez, Sammamish, WA (US); Carlos Brito, Sammamish, WA (US); Jason Henderson, Tacoma, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 332 days.

(21) Appl. No.: 13/685,568

(22) Filed: Nov. 26, 2012

(65) Prior Publication Data

US 2013/0282643 A1  Oct. 24, 2013

Related U.S. Application Data

(60) Provisional application No. 61/635,394, filed on Apr. 19, 2012.

(51) Int. Cl.
*G06N 5/02* (2006.01)
*G06F 17/30* (2006.01)

(52) U.S. Cl.
CPC ............ *G06N 5/02* (2013.01); *G06F 17/30014* (2013.01); *G06F 17/30899* (2013.01)

(58) Field of Classification Search
CPC ................ G06N 5/02; G06F 17/30014; G06F 17/30899
See application file for complete search history.

(56) References Cited

U.S. PATENT DOCUMENTS

| 7,487,446 | B2 | 2/2009 | Hargarten et al. |
| 8,024,335 | B2 | 9/2011 | Anthony et al. |
| 2010/0131529 | A1* | 5/2010 | Kasera et al. ................. 707/758 |

FOREIGN PATENT DOCUMENTS

WO    2010/062862 A2    6/2010

OTHER PUBLICATIONS

Warren, Tom., "Exclusive: Microsoft Office 15 will Include Third-Party 'Agaves' Web Extensions", Retrieved at <<http://www.theverge.com/2012/3/15/2873595/office-15-agaves-web-applications>>, Mar. 15, 2012, pp. 9.

(Continued)

*Primary Examiner* — Stanley K Hill
(74) *Attorney, Agent, or Firm* — Louise Bowman; Jim Ross; Micky Minhas

(57) ABSTRACT

A web extension and content are linked contextually. A user interaction with the content launches a process to match a regular expression rule from the web extension to a portion of the content. An entity matching the regular expression rule is recorded and transmitted back to the web extension. Matched entity is integrated into the rule. The integrated rule is displayed in a web extension pane. The integrated rule and the entity are highlighted within the web extension pane and the content pane, respectively. The highlighted entity and the highlighted rule illustrate a contextual link between the web extension and the content.

18 Claims, 6 Drawing Sheets

(56) References Cited

OTHER PUBLICATIONS

Arghire, Ionut., "Microsoft to Pack Third-Party "Agaves" Web Extensions in Office 15", Retrieved at <<http://news.softpedia.com/news/Microsoft-to-Pack-Third-Party-Agaves-Web-Extensions-in-Office-15-258843.shtml>>, Mar. 19, 2012, pp. 2.

"Professional Office Software", Retrieved at <<http://www.lovecrowd.org/2012/03>>, Mar. 30, 2012, pp. 8.

"Microsoft Office 15 to allow 'Agave' Web Extensions", Retrieved at <<http://www.electronista.com/articles/12/03/15/office.15.to.support.web.extensions.dubbed.agaves/>>, Mar. 15, 2012, pp. 9.

"Microsoft Office 15 will Support Third-Party 'Agaves' Web Extension", Retrieved at <<http://www.theexcelblog.info/microsoft-office-15-will-support-third-party-agaves-web-extension.html>>, Mar. 19, 2012, pp. 4.

"Extension Activation for Related Documents", U.S. Appl. No. 13/361,097, filed Jan. 30, 2012, pp. 24.

"Extensibility Features for Electronic Communications", U.S. Appl. No. 13/103,614, filed May 9, 2011, pp. 50.

"International Search Report", Mailed Date: Jul. 19, 2013, Application No. PCT/US2013/036262, Filed date: Apr. 12, 2013, pp. 11.

DJ, Adams, "Getting started with Gmail contextual Gadgets", Retrieved at: <<http://www.pipetree.com/qmacro/blog/2010/06/getting-started-with-gmail-contextual-gadgets>>, DJ's Weblog, Retrieved on: Jul. 11, 2013, pp. 8.

* cited by examiner

LINKING WEB EXTENSION AND CONTENT CONTEXTUALLY

CROSS REFERENCE TO RELATED APPLICATIONS

This application claims the benefit of U.S. Provisional Patent Application Ser. No. 61/635,394 filed on Apr. 19, 2012. The disclosures of the provisional patent application are hereby incorporated by reference for all purposes.

BACKGROUND

Data analysis is an integral part of modern services provided by software. Analysis services span a vast array of information mining and mapping. Analysis systems receive content from variety of resources including business and social networking systems. User information is also gathered and collected from ever expanding array of personal devices. User generated content is stored and managed by expansive systems providing interactive services with the stored information. The ever expanding amount of information generated by systems and users are processed by analysis systems to produce patterns, predictions, etc. Analysis results are utilized by other systems relying on the results to generate reports, evaluate user performance, determine recommendations, etc.

Analysis tools personalize data analysis for consumption by users. Standalone tools enable users to configure analysis parameters to meet analysis demand. Integrated tools enable a user to expand capabilities of existing software with analysis services. Analysis tools integrated to a legacy application can enhance the application through expanded features. The expanded software can provide variety of analysis services including data mining, reporting, etc. Beyond integration, an expanded software can act as a single point of interaction between the user and the data. A single point of interaction may ease user access by providing the user with a familiar interface which is also used to provide analysis services. An existing application with integrated analysis features can provide a comfortable user interface to a user and expand the user's productivity through the added features.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to linking a web extension and content contextually. According to some embodiments, an application may retrieve a regular expression rule of a web extension from a manifest. The manifest may be structured language (e.g., an extensible markup language "XML") container of web extensions. Next, the content to be processed may be detected during presentation of the content to a user. Content may include textual and graphical content along with combinations. The content may be processed using the regular expression rule to find a matching entity. The regular expression rule may describe a pattern that may match an entity within the content. In addition, the application may emphasize the matched entity within the content and the associated rule within the web extension to contextually link the content to the web extension.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
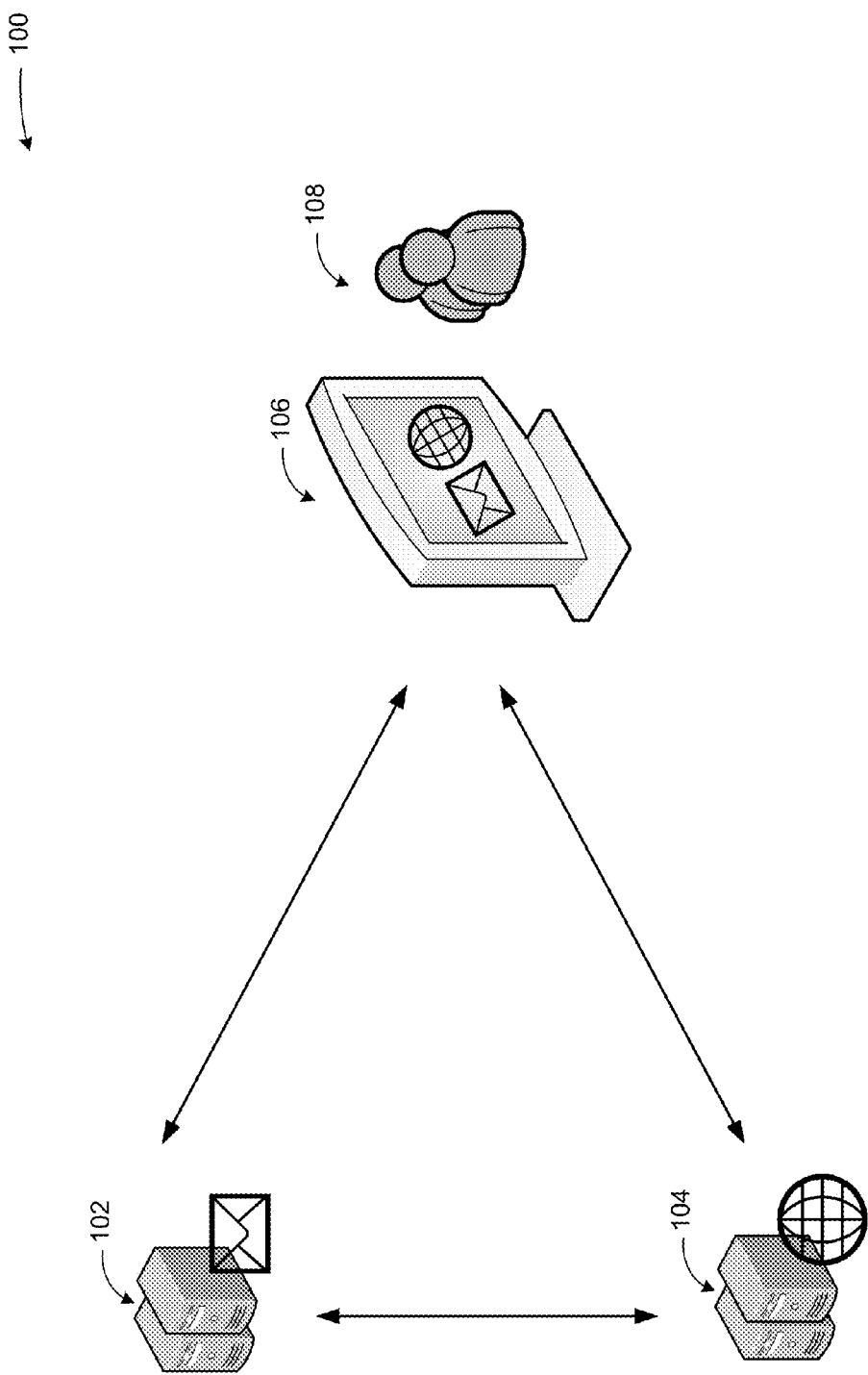
FIG. 1 illustrates an example architecture diagram where an application may link a web extension and content contextually according to some embodiments.

As briefly described above, a web extension may be linked contextually to content. A detected content may be processed for an entity matching a regular expression rule of a web extension. Matched entity may be emphasized within the content. The associated rule may also be emphasized within the web extension.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for linking a web extension and content contextually. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example architecture diagram where an application may link a web extension to content contextually according to some embodiments. The components and environments shown in diagram 100 are for illustration purposes. Embodiments may be implemented in various local, networked, cloud-based and similar computing environments employing a variety of computing devices and systems, hardware and software.

An example server 102 may host content. The content may include a variety of media, including but not exclusive to textual, graphical, audio, video, etc. The content may also include media composed of combination of other media including an email message and a web site. The content may be consumed by variety of sources including user device 106 and third party server 104.

A third party server 104 may further analyze the content. The third party server 104 may use a web extension to analyze the content. A web extension may have one or more regular expression rules that may match an entity within the content. The entity may include a portion of the content contextually linked to the web extension. An example may include a phone number embedded within the content which a web extension may recognize through a regular expression rule for phone numbers. Additionally, the content and one or more web extensions used to process the content may be displayed to one or more users 108 through a display device 106.

A web extension may specify one or more default or custom entities in the activation rules specified in the XML manifest. If present, built-in entities may be extracted on a server associated with the hosting application, and stamped on the document or message at delivery time. Activation rules including custom entities may be evaluated at run-time on the client application (hosting the web extension) and if the rule condition is satisfied, the custom entities may be stored in memory. When a user selects an item (word processing document, spreadsheet, email message or appointment item) in a view or opens the item in a separate window, rules specified in manifest may be evaluated. If the rules evaluate to true, a button control for the web extension may be displayed on the web extension menu. When the user clicks the button on the extension menu or similarly selects the web extension, the web extension may be initialized and built-in and custom entities returned to the web extension via the JavaScript Object Model (JSOM) or similar mechanism. The web extension content pane may be displayed below the web extension menu and render the HTML content of the web extension. If the web extension has requested hit-highlighting of entities in its manifest, built-in and custom entities may be highlighted in the body of the document/message so that the user can identify entities shown in the web extension content pane contextually in the document/message body.

Embodiments are not limited to implementation in a client-server type architecture. A web extension may be linked contextually to content by an application executed in a peer-to-peer, distributed, cloud based, and combination type architecture. In an example scenario, an application may process the content using the web extension entirely in the display device 106.

Figure 2:
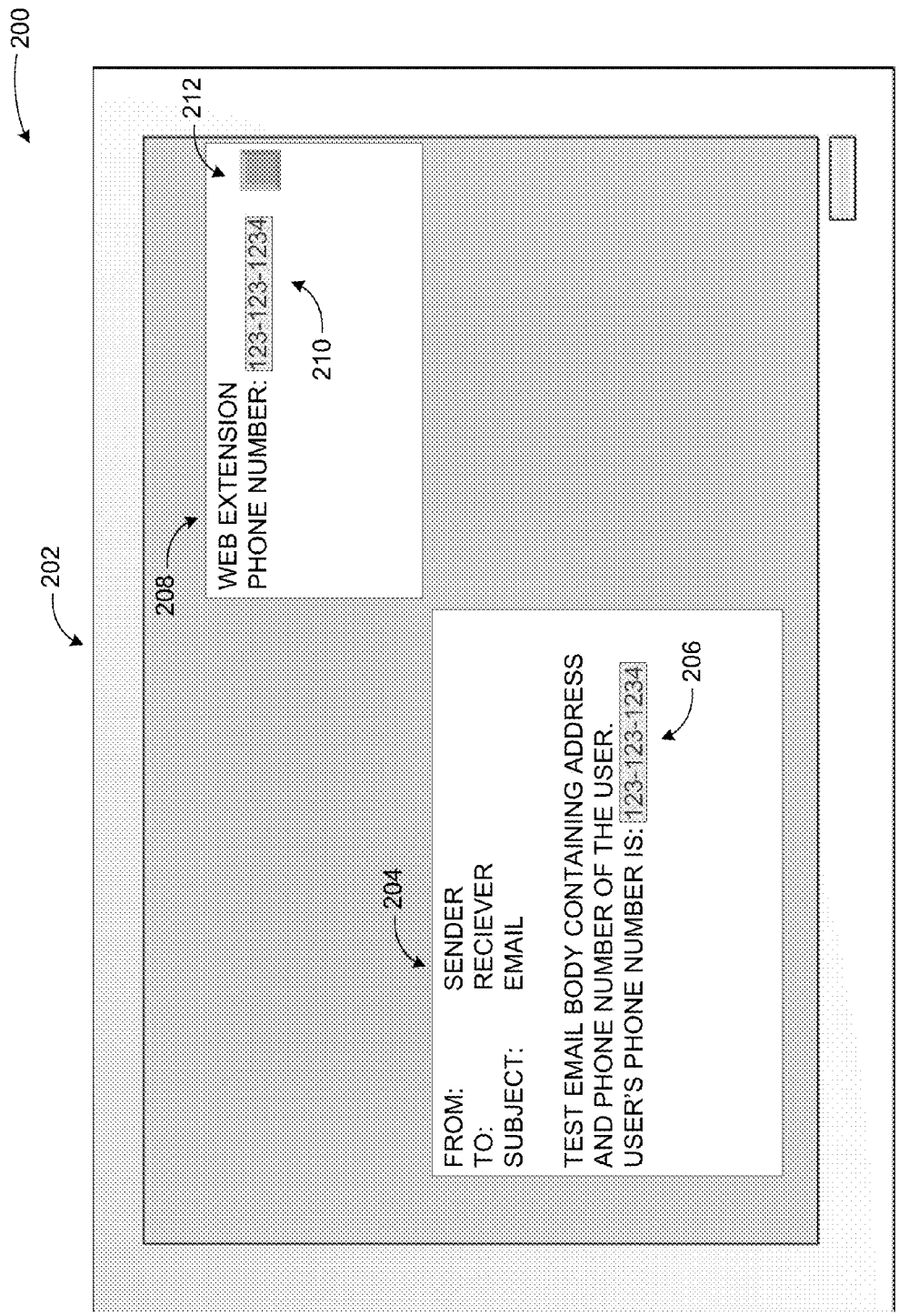
FIG. 2 illustrates an example display showing a web extension and content linked contextually according to embodiments.

FIG. 2 illustrates an example display showing a web extension and content linked contextually according to embodiments. Diagram 200 displays example content and web extension panes emphasizing a matched entity within the content and an associated rule within the web extension.

Display device 202 may display content to a user through a content pane 204. An application according to embodiments may process the content using a web extension upon detecting the content. Content may be detected upon a user action to display the content. Content detection may include presentation of the content to the user. In an example scenario, content such as an email message may be received and displayed in content pane 204. Alternatively, the content may be detected automatically upon receiving the content from a source. In an example scenario, the application may detect an email message as the content, automatically, after receiving the email message from an email server.

The application may process the detected content using a web extension. The web extension pane 208 may display the web extension used to process the content. Processing may include searching for an entity matching a regular expression rule contained by the web extension. In an example scenario, the application may process the content with a regular expression rule 210 which may match an entity 206 within the content.

If the application may determine an entity matching the regular expression rule, the application may display a control 212 to illustrate a contextual link between the web extension and the content. If the user activates the control 212, the entity and the associated regular expression rule may be emphasized to alert the user of the contextual link between the web extension and the content. Rules and entities may be emphasized using variety of schemes including highlighting the entity within the content and the rule within the web extension. Alternatively a notification may be used to alert the user to the contextual link. The notification may include a pop-up alert warning the user to a rule matching an entity. The application may employ multiple pop-up alerts near proximity of the rule and the entity to draw attention to the contextual link between the web extension and the content.

Figure 3:
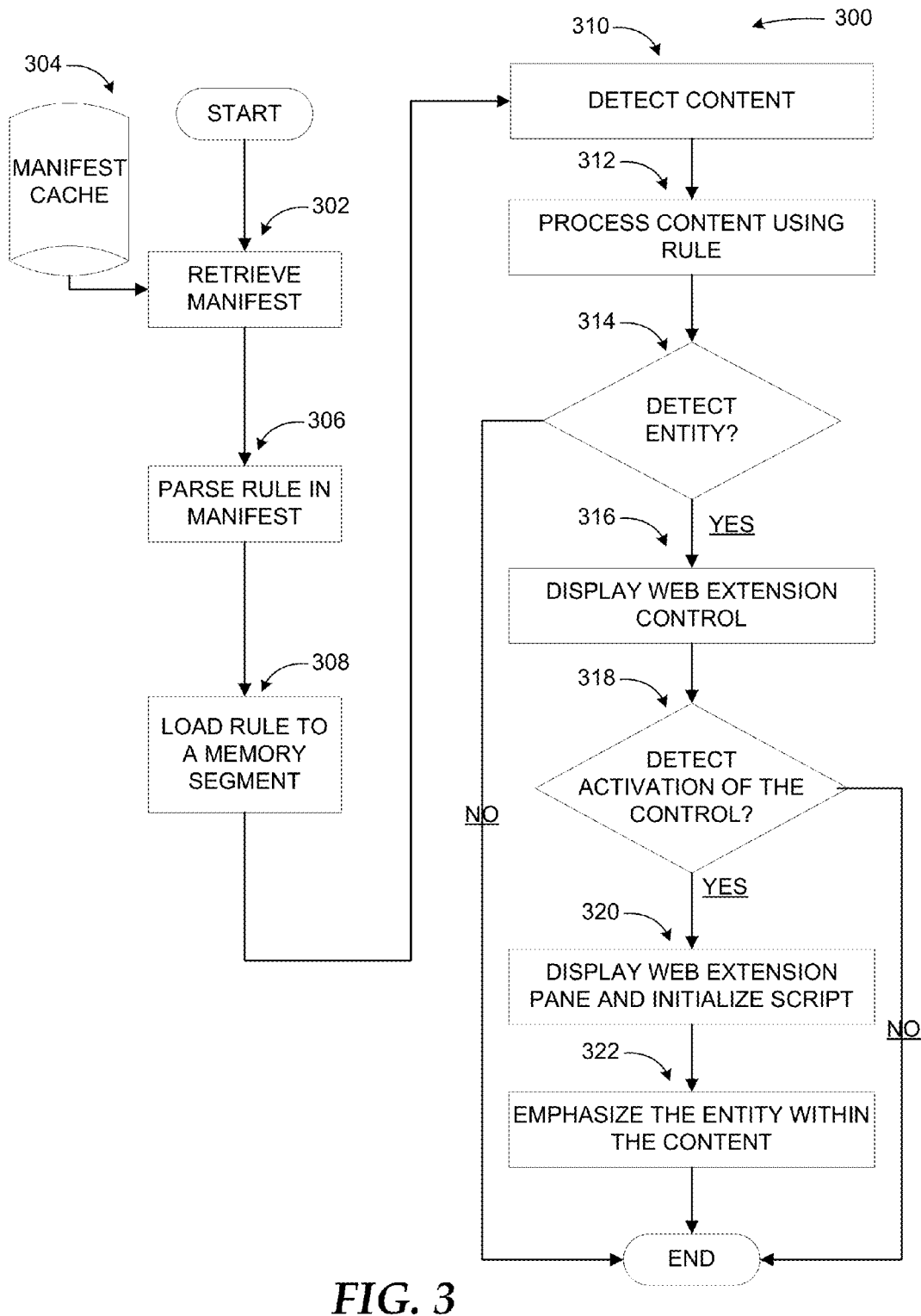
FIG. 3 illustrates a flow diagram implementing an example embodiment.

FIG. 3 illustrates a flow diagram implementing an example embodiment. Diagram 300 displays an example process to emphasize a contextual link between a web extension and content.

An application, according to embodiments, may retrieve a manifest 302 from cache 304. The manifest may be formatted using extensible markup language (XML) or similar format. The manifest may contain one or more web extensions. A web extension may include a regular expression rule. The application may parse the regular expression rule 306. Parsing may involve activating one or more web extensions in the manifest. An activated web extension may provide the regular expression rule to process the content at run-time. Next, the rule may be loaded to a memory segment 308 in preparation of processing the content.

Content 310 may be detected as a result of a user action interacting with the content. An example may be a user initiating an email application client to read an email message. Upon detecting the content, the content may be processed using one or more rules 312 in the memory. If an entity 314 matching one of the rules is detected, a web extension control 316 may be displayed. The web extension control may be used to interact with the user to emphasize the matched entity and the associated rule. If the application detects activation of the control 318, the application may display a web extension pane 320 integrated to a navigation bar for web extensions. A script included in the web extension may be executed to transmit the matched entity within the content to the web extension. The matched entity and the associated rule may be displayed in hyper markup text language (html) or comparable format within the web extension pane. The associated rule may be emphasized through a scheme, such as highlighting, to establish a contextual link with the entity within the content. In addition, the matched entity within the content may also be emphasized through a similar scheme 322 used to emphasize the rule. In an example scenario, the associated rule may be highlighted within the web extension scheme. The matched entity may be highlighted within the content pane.

In an alternative scenario when the application does not match a portion of the content to any rule in the memory, the application may return to a wait mode. The wait mode may enable detection of other content for processing with regular expression rules from web extensions. Similarly, if a displayed web extension control is not activated, the application may not emphasize matched entity within content and an associated rule within a web extension.

Additionally, the manifest may contain an XML element specifying automation of the emphasis process. If the application determines the XML element specifying an automated emphasis of the entity and the associated rule, the web extension control may be disabled. In addition, the matched entity and the associated rule may be automatically emphasized while displaying the content in the content pane and the web extension in the web extension pane. Furthermore, the matched entity may be transmitted to the web extension after formatting the matched entity in a script object model (SOM) standard. Upon receiving the matched entity, it may be translated using the SOM entity and displayed in html format alongside the rule. Alternatively, the matched entity may be integrated into the associated rule when emphasizing the rule within the web extension.

The example scenarios and schemas in FIG. 2 through 3 are shown with specific components, data types, and configurations. Embodiments are not limited to systems according to these example configurations. Linking a web extension and content contextually may be implemented in configurations employing fewer or additional components in applications and user interfaces. Furthermore, the example schema and components shown in FIG. 2 through 3 and their subcomponents may be implemented in a similar manner with other values using the principles described herein.

Figure 4:
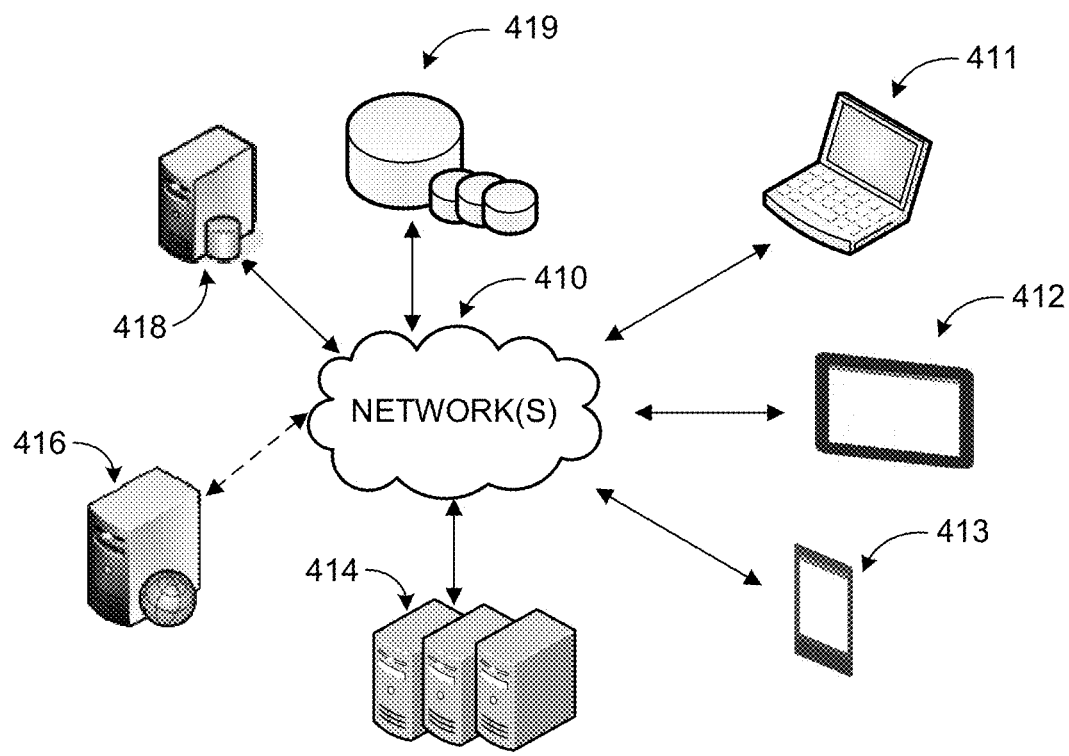
FIG. 4 is a networked environment, where a system according to embodiments may be implemented.

FIG. 4 is a networked environment, where a system according to embodiments may be implemented. Local and remote resources may be provided by one or more servers 414 or a single server (e.g. web server) 416 such as a hosted service. An application, such as a purchase management application, may execute on individual computing devices such as a smart phone 413, a tablet device 412, or a laptop computer 411 ('client devices') and communicate with customer and product information providers through network(s) 410.

As discussed above, an application may link a web extension to content contextually. The content may be processed using a regular expression rule from a web extension. A matched entity within the content and the associate rule may be emphasized to illustrate a contextual link between the web extension and the content. Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to link a web extension and content contextually. Furthermore, the networked environments discussed in FIG. 4 are for illustration purposes only. Embodiments are not limited to the example applications, modules, or processes.

Figure 5:
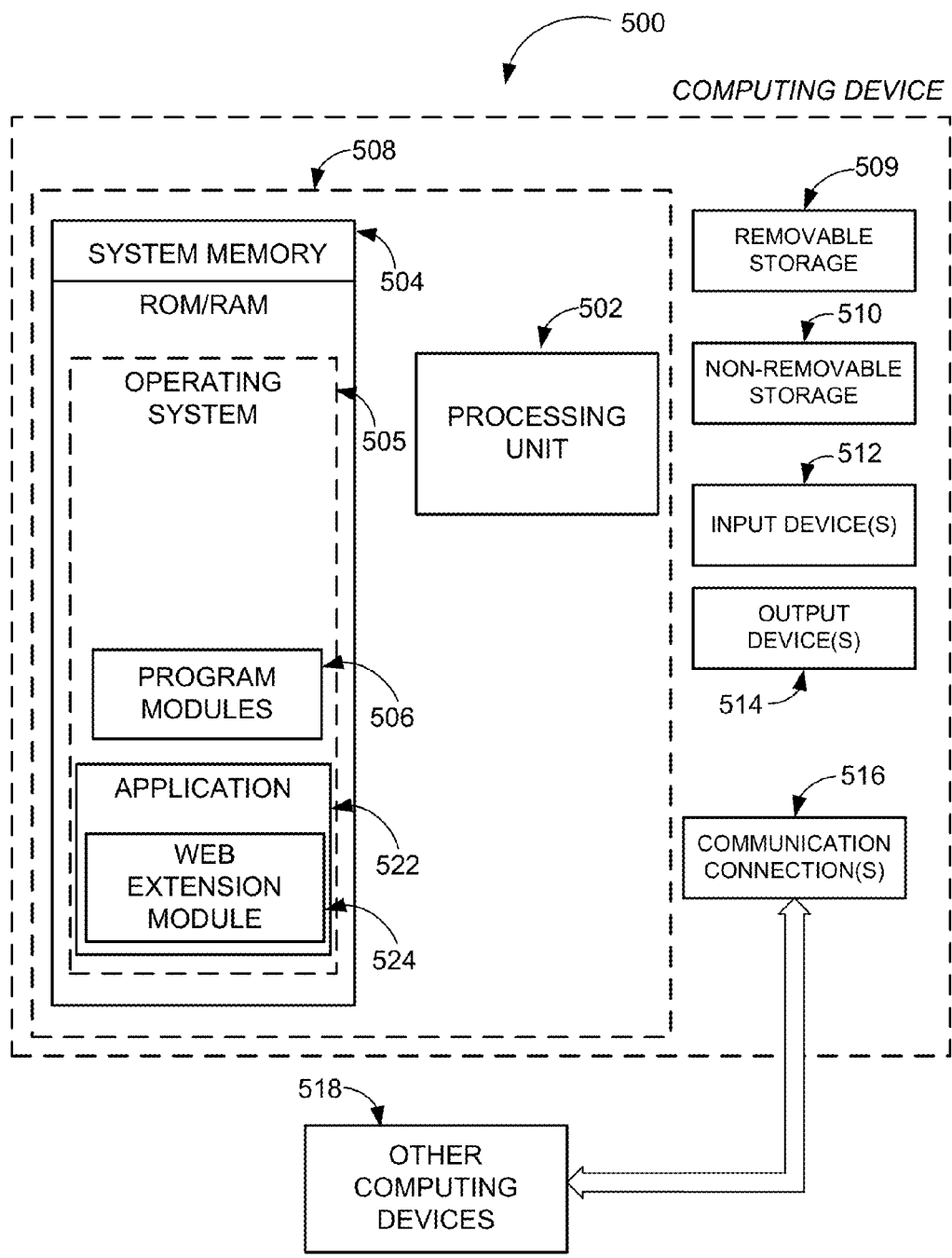
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® and WINDOWS PHONE® operating systems from MICROSOFT CORPORATION of Redmond, Wash. The system memory 504 may also include one or more software applications such as program modules 506, an application 522, and a web extension module 524.

The application 522 may link a web extension and content contextually according to embodiments. The application 522 may load one or more regular expression rules within one or more web extensions into memory for processing the content. The web extension module 524 may process the content using the rules to determine one or more matched entities within the content. The web extension module 524 may provide a control to activate emphasizing of the matched entity and the associated rule to establish the contextual link between the web extension and the content. This basic configuration is illustrated in FIG. 5 by those components within dashed line 508.

Computing device 500 may have additional features or functionality. For example, the computing device 500 may also include additional data storage devices (removable and/ or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. Computer readable storage media is a computer readable memory device. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch and/or gesture input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
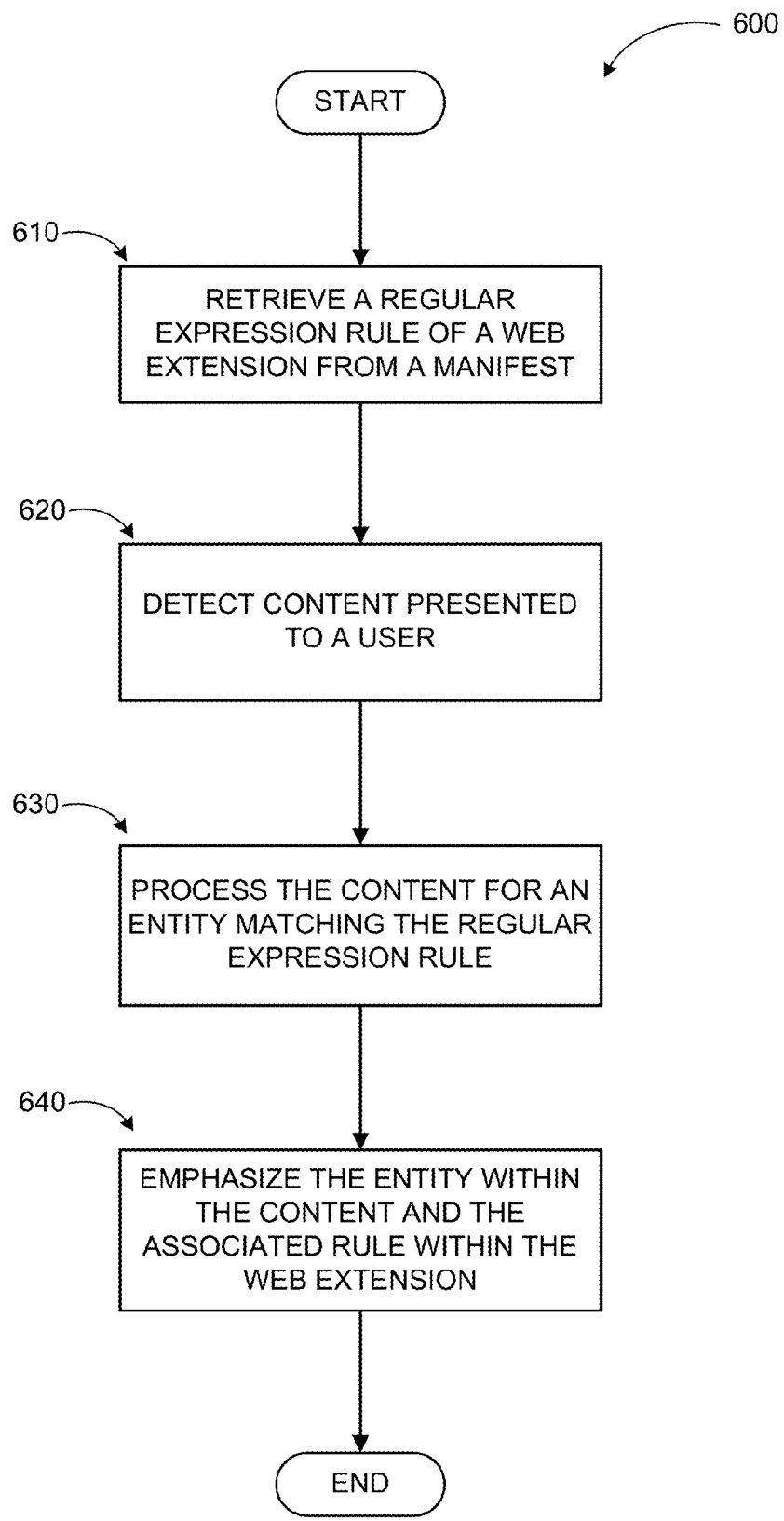
FIG. 6 illustrates a logic flow diagram for a process linking a web extension and content contextually according to embodiments.

FIG. 6 illustrates a logic flow diagram for a process linking a web extension and content contextually according to embodiments. Process 600 may be implemented by an application in some examples.

Process 600 may begin with operation 610 where the application may retrieve a regular expression rule of a web extension from a manifest. The manifest may be formatted in XML and stored in cache, such as a memory cache or a disk cache. Content presented to a user may be detected at operation 620. Content may be detected as a result of the user interacting with the content. At operation 630, the content may be processed for an entity matching the regular expression rule. The entity may be a component of the content described by the regular expression rule. Next, the application may emphasize the entity within the content and the associated rule within the web extension at operation 640. The matched entity may be highlighted in a content pane and the associated rule may be highlighted in a web expression pane.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 600 for illustration purposes. Linking a web extension and content contextually according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for linking a web extension and content contextually, the method comprising:
   receiving a manifest formatted using extensible markup language (XML) from a cache, wherein the manifest includes the web extension and specifies a time period to activate the web extension;
   in response to a detection of the activation of the web extension, retrieving a regular expression rule of the web extension from the manifest and loading the regular expression rule into a memory of the computing device, wherein the web extension specifies entities in the regular expression rule and wherein the regular expression rule is a description of a pattern that matches an entity within the content;
   extracting the entities on a server associated with an application of the computing device, wherein the application hosts the web extension;
   evaluating the regular expression rule at run-time on the application;
   in response to a detection of a user action to display the content, detecting the content;
   processing the content with the web extension to match the regular expression rule of the web extension to the entities in the content;
   storing the entities in the memory of the computing device and linking the entities to the web extension contextually;
   displaying the content and the web extension that includes the entities that are contextually linked to the web extension; and
   emphasizing the entities within the content and the web extension by utilizing a highlighting scheme to highlight the entities, wherein the highlighting scheme emphasizes a contextual link between the entities and the web extension.

2. The method of claim 1, wherein the cache includes one of: a memory cache and a disk cache.

3. The method of claim 1, further comprising:
determining the content automatically upon receiving the content from a source.

4. The method of claim 1, further comprising:
searching for the entities within the content by matching a pattern described by the regular expression rule to a portion of the content.

5. The method of claim 1, further comprising:
in response to a detection that the entities match the regular expression rule, displaying a web extension control to emphasize the entities and the regular expression rule, wherein the web extension control is configured to interact with a user to emphasis the entities that match the regular expression rule; and
detecting an activation of the web extension control.

6. The method of claim 5, further comprising:
displaying a web extension pane adjoining a navigation bar control for the web extension to render the regular expression rule within the web extension pane.

7. The method of claim 6, further comprising executing a script included in the web extension to transmit the entities to the web extension.

8. The method of claim 7, further comprising:
integrating the entities to the regular expression rule; and
rendering an integrated regular expression rule within the web extension.

9. A computing device for linking a web extension and content contextually, the computing device comprising:
a memory configured to store instructions; and
a processor coupled to the memory, the processor executing an application in conjunction with the instructions stored in the memory, wherein the application is configured to:
receive a manifest formatted using extensible markup language (XML) from a cache including at least one of: a memory cache and a disk cache, wherein the manifest includes the web extension and specifies a time period to activate the web extension;
in response to a detection of the activation of the web extension, retrieve a regular expression rule of the web extension from the manifest and load the regular expression rule into the memory, wherein the web extension specifies entities in the regular expression rule and wherein the regular expression rule is a description of a pattern that matches an entity within the content;
extract the entities on a server associated with the application, wherein the application hosts the web extension;
evaluate the regular expression rule at run-time;
in response to a detection of a user action to display the content, detect the content;
process the content with the web extension to match the regular expression rule of the web extension to the entities in the content;
store the entities in the memory and link the entities to the web extension contextually;
display the content and the web extension that includes the entities that are contextually linked to the web extension; and
emphasize the entities within the content and the web extension by utilizing a highlighting scheme to highlight the entities, wherein the highlighting scheme emphasizes a contextual link between the entities and the web extension.

10. The computing device of claim 9, wherein the application is further configured to:
utilize the scheme to emphasize the entities and the regular expression rule including a notification scheme.

11. The computing device of claim 10, wherein the application is further configured to:
employ at least one pop-up alert as the notification scheme.

12. The computing device of claim 9, wherein the application is further configured to:
detect an inability to match the regular expression rule to a portion of the content; and
convert the application to a wait mode, wherein the wait mode enables a detection of other content to process with the regular expression rule from the web extension.

13. The computing device of claim 9, wherein the application is further configured to:
determine an XML element in the manifest specifying an automated emphasis of the entities and the regular expression rule.

14. The computing device of claim 13, wherein the application is further configured to:
automatically highlight the entities within the content while displaying the content in a content pane and the regular expression rule within the web extension presented in the web extension.

15. A method executed on a computing device to link a web extension and content contextually, the method comprising:
receiving a manifest formatted in extensible markup language (XML) from a cache including at least one of: a memory cache and a disk cache, wherein the manifest includes the web extension and specifies a time period to activate the web extension;
in response to a detection of the activation of the web extension, retrieving a regular expression rule of the web extension from the manifest and loading the regular expression rule into a memory of the computing device, wherein the web extension specifies entities in the regular expression rule and wherein the regular expression rule is a description of a pattern that matches an entity within the content;
extracting the entities on a server associated with an application of the computing device, wherein the application hosts the web extension;
evaluating the regular expression rule at run-time on the application;
in response to a detection of a user action to display the content, detecting the content;
processing the content with the web extension to match the regular expression rule of the web extension to the entities in the content;
storing the entities in the memory of the computing device and linking the entities to the web extension contextually;
displaying the content and the web extension that includes the entities that are contextually linked to the web extension;
determining an XML element in the manifest specifying an automated emphasis of the entities and the regular expression rule; and
emphasizing the entities within the content and the web extension by utilizing a highlighting scheme to highlight the entities, wherein the highlighting scheme emphasizes a contextual link between the entities and the web extension.

16. The method of claim 15, further comprising:
executing a script to transmit the entity to the web extension;

formatting the entities in a script object model (SOM) standard; and transmitting the entities to the web extension.

17. The method of claim 16, further comprising:

translating the entities using the SOM standard;

integrating the entities to the regular expression rule in the web extension; and rendering the regular expression rule within the web extension.

18. The method of claim 15, further comprising:

illustrating the contextual link between the content and the web extension through emphasized entities and an emphasized regular expression rule.

* * * * *